May 29, 1962 K. S. SCHARMAN 3,036,627
SOLAR-DISSIPATOR
Filed April 22, 1959
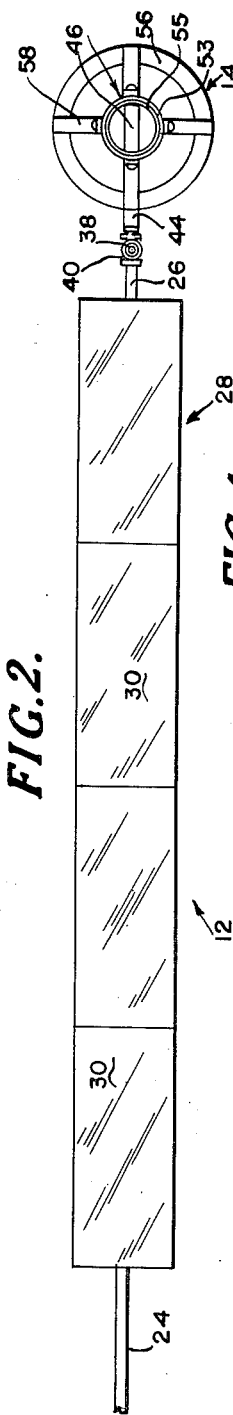
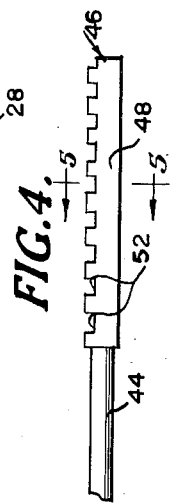
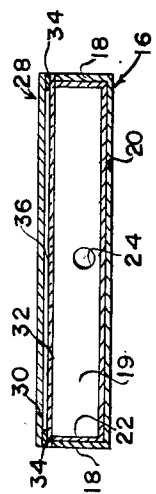
INVENTOR
KENNETH S. SCHARMAN
BY Cushman, Darby & Cushman
ATTORNEYS United States Patent Office 3,036,627
Patented May 29, 1962

3,036,627
SOLAR-DISSIPATOR
Kenneth S. Scharman, Cottonwood Lane, Tucson, Ariz.
Filed Apr. 22, 1959, Ser. No. 808,234
5 Claims. (Cl. 159—4)

This invention generally relates to the disposal of liquid waste and has particular reference to a solar-dissipator for dispersing water or sewage effluents into the atmosphere where normal drainage of the liquids would not be practicable.

The primary object of the present invention resides in the provision of an improved solar-dissipator which utilized solar energy for heating the effluent material to an elevated temperature so that it can be effectively atomized and dispersed by evaporation into the atmosphere.

Another important object of this invention is the provision of a solar-dissipator which is thoroughly reliable and efficient in operation, completely sanitary and odorless, possessing but few parts, relatively inexpensive to manufacture, and otherwise well adapted for the purposes for which the same is intended.

Other objects and the entire scope of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent as the description herein progresses.

Reference being made to the accompanying drawing which forms a part hereof, wherein like numerals refer to like parts throughout, and in which:

FIGURE 1 is a side elevational view, partially in section, of a solar-dissipator construction in accordance with the present invention;

FIGURE 2 is a top plan view of the solar-dissipator illustrated in FIGURE 1;

FIGURE 3 is a cross sectional view taken along the line 3—3 of FIGURE 1;

FIGURE 4 is an enlarged fragmentary view of a liquid distributing weir utilized in the present invention; and FIGURE 5 is a cross sectional view taken along the line 5—5 in FIGURE 4.

Referring now to the drawing in detail, wherein for the purposes of illustration, there is described a preferred embodiment of the present invention, the numeral 10 represents a solar-dissipator which generally comprises a solar heating unit 12 and a vertical atomizing chamber 14. The solar heater 12 preferably includes an elongated insulating housing 16 made of fiberboard or the like, which has a pair of exterior side walls 18, end walls 19, and a bottom wall 20 extending therebetween. Located within the insulated housing 16 is a metallic liner or tray member 22 which serves as a liquid receptacle and is provided with a fluid inlet pipe 24 and fluid outlet pipe 26 connected respectively with a source of liquid supply and the vertical atomizing chamber 14 where the heated water is dispersed.

Extending across the top of the insulating housing 16 directly above the liquid receptacle 22, is an upper solar window 28 consisting of an outer panel 30 and an inner panel 32 of glass or similar material, separated by appropriate spacers 34 to form an insulating dead air space therebetween. By means of the transparent solar window 28, the fluid within the liquid receptacle 22 will be continuously exposed to solar energy. Since the liquid receptacle 22 has been insulated from the atmosphere by the housing 16 and dead air space 36, the heated fluid will remain at a relatively constant elevated temperature. In order to obtain higher temperatures within the solar heat exchanger, the solar energy may be intensified by constructing a solar window 28 in the form of a lens (not shown) to concentrate the converging light rays from the sun. However, it should be pointed out that the size and shape of the solar heating unit employed may be widely varied in order to adequately heat different volumes of liquid.

In order to control circulation of fluid through the solar heater 12, the elongated housing 16 can be inclined slightly with respect to the horizontal so that when the fluid waste enters receptacle 22 through inlet 24, it will flow downwardly toward outlet 26. Alternatively, the entire heating unit could either be pressurized or subjected to a negative vacuum pressure created in the atomizing chamber 14 to aid in the circulation of fluid through the system.

After the liquid waste has been circulated through the solar heater 12 and discharged through outlet pipe 26, suitable chemicals; such as, chlorine, disinfectant, or deodorizers can be added. These chemicals preferably are introduced through a supply line 38 which is coupled directly with outlet pipe 26 by a T-union 40. A suitable valve 42, mounted in supply line 38, may be used to selectively control the amount of chemicals which will be mixed with the heated liquid. Coupled to the discharge outlet of T-union 40 is a conduit 44 which directs the heated and chemically treated liquid waste to the vertical atomizing chamber 14, in a manner which will become readily apparent.

Referring now more specifically to the vertical atomizing chamber 14, a hollow vertical stack 54 of cylindrical outline is provided having an upper portion 53 which vents to the atmosphere and a lower portion 55 which extends downwardly into and is concentrically mounted within a lower sludge tank or well member 56. The vertical stack 54 is adjustably secured to the sludge tank 56 by a plurality of circumferentially arranged angle brackets 58 so that it can be vertically elevated or lowered to control atomization of the liquid waste.

In order to effectively atomize and vaporize the heated liquid after it has been discharged from the solar heater 12, a fluid distributing weir 46, in the form of a wedge shaped trough defined by a pair of inclined bottom walls 48, is employed to initially disperse the liquid when it reaches the interior of the atomizing chamber 14 through conduit 44. The distributing weir 46, which is connected directly to the terminal end of conduit 44, is positioned adjacent the top of sludge tank 56 and is completely enclosed within the hollow vertical stack 54. A plurality of recessed notches 52 have been formed along the upper edges of the inclined bottom walls 48 to aid in dispersing the heated liquid as it overflows from the distributing weir 46 and spills downwardly through the vertical stack 54 toward the sludge tank 56.

Each of the distributed liquid streams overflowing through the spillway notches 52 will encounter a stream of air moving upwardly through vertical stack 54 past the fluid distributing weir 46 at a high velocity. The air stream will immediately atomize the liquid to such an extent as to form a homogeneous vapor which is then discharged through the upper portion 53 of stack 54 and dissipated into the atmosphere. A variable speed and variable pitch blower unit 60, preferably mounted within the vertical stack 54 below weir 46 by braces 62, can be regulated to control the velocity of air flow through the stack so that it will be proportional to the volume of heated liquid entering the atomizing chamber 14. As the air enters the lower intake portion 55 and is forced upwardly through the restrictive vertical stack 54, it will become saturated with the vaporized liquid while any foreign solid particles present in the liquid waste will be deposited in the sludge tank 56. Any portion of the liquid which may escape past the blower 60 will fall into sludge tank 56 and can be separated for recirculation or handled in any convenient local manner.

The vertical stack 54 can be varied in height so that the homogeneously atomized vapor may be discharged at different elevated planes to accommodate local necessities as to surroundings, wind velocity, etc. Additionally any disagreeable or noxious odors can easily be avoided by mixing a suitable chemical purifier with the heated effluent material before it is subjected to the vaporizing action of the air stream.

The aforementioned solar-dissipator has been specifically designed for the purpose of eliminating water or sewage effluents by diffusing the liquid in the atmosphere where normal drainage would not be practicable and is especially adapted for use in arid regions where there generally exists many hours of sunshine and unsaturated air of low relative humidity. Moreover, the solar heating unit 12 has been designed to efficiently heat liquids by use of solar energy. As in the case of the solar heater, the vertical atomizing chamber 14 can be made in various sizes and capacities to meet specific demands.

It is also to be understood that, although a preferred embodiment of the invention has been illustrated and described with considerable particularity in the foregoing specification, the invention is not limited to the specific details of construction, shown and described, but includes all modifications coming within the scope of the appended claims and their equivalents.

I claim:

1. A solar-dissipator for the disposal of liquid waste comprising in combination, a solar heating unit which utilizes solar energy to heat said liquid, a dispersion chamber having an inlet in fluid communication with said heating unit, said chamber including a lower sludge tank and an upper hollow stack, said hollow stack having a lower portion which extends downwardly into said sludge tank and an upper portion which is vented to the atmosphere, an air blower unit mounted within the lower portion of said stack for directing a stream of air upwardly therethrough, and a fluid distributing weir located within said stack above said blower unit, said weir being in fluid communication with the inlet of said dispersion chamber.

2. A solar-dissipator as set forth in claim 1 wherein the upper edges of said distributing weir are notched to form a plurality of fluid spillways.

3. A solar-dissipator as defined in claim 2 wherein said distributing weir is located within the lower portion of said hollow stack.

4. A solar-dissipator for the disposal of liquid effluents comprising in combination, a solar heating unit which utilizes solar energy to heat the liquid, said heating unit including an insulated fluid receptacle having a fluid inlet and outlet, said inlet communicating with a source of liquid effluent, a transparent solar window mounted above said fluid receptacle in position to receive sun rays which will transmit solar energy to the liquid effluent circulating through said heating unit, a vertical dispersion chamber having a fluid inlet, conduit means connecting the fluid receptacle outlet with the chamber inlet, said chamber including a lower sludge tank and an upper hollow stack, said hollow stack having a lower portion which extends vertically downwardly into said sludge tank and an upper portion which is vented to the atmosphere, an air blower unit mounted within the lower portion of said stack for directing a stream of air upwardly therethrough, and a fluid distributing weir located within said stack above said blower unit having a plurality of notched spillways formed along the upper edges thereof, said weir being in fluid communication with the chamber inlet, whereby the heated liquid effluent will be dispersed by the air stream and discharged into the atmosphere in a vaporized state.

5. A solar-dissipator of the type set forth in claim 4 including a supply line communicating with said conduit means for selectively introducing a chemical purifier into the solar-heated liquid effluent.

References Cited in the file of this patent

UNITED STATES PATENTS

| | | |
|---|---|---|
| 621,718 | Seymour | Mar. 21, 1899 |
| 822,980 | Otto | June 12, 1906 |
| 1,101,001 | Willsie | June 23, 1914 |
| 1,613,334 | Symmes | Jan. 4, 1927 |
| 1,672,750 | Christiansen | June 5, 1928 |
| 1,796,982 | Cutler | Mar. 17, 1931 |
| 2,002,252 | Stam | May 21, 1935 |
| 2,118,803 | Bowen | May 31, 1938 |
| 2,678,541 | Sheen | May 18, 1954 |

FOREIGN PATENTS

| | | |
|---|---|---|
| 28,130 | Great Britain | A.D. 1907 |

OTHER REFERENCES

Manual of Sewage Disposal Equipment, published by Public Works Magazine, 1941, 310 E. 45th Street, New York city, page 57.

"Energy From the Sun," Power Engineering, February 1957, pp. 94–97 and 114 and 118.